Dec. 21, 1948.   O. J. MORELOCK   2,456,833
MUTUAL CONDUCTANCE TESTER
Filed Oct. 31, 1945   2 Sheets-Sheet 1

Inventor:
Oliver James Morelock,
By
Pierce + Scheffler,
Attorneys.

Patented Dec. 21, 1948

2,456,833

UNITED STATES PATENT OFFICE 2,456,833

MUTUAL CONDUCTANCE TESTER

Oliver James Morelock, Short Hills, N. J., assignor to Weston Electrical Instrument Corporation, Newark, N. J., a corporation of New Jersey Application October 31, 1945, Serial No. 625,761

13 Claims. (Cl. 315—370)

This invention relates to apparatus for measuring the mutual conductance of commercial receiving type vacuum tubes, and particularly to apparatus energized from the customary alternating power and light circuits and of small size for use as a separate unit or for incorporation in a more elaborate tube checker.

Mutual conductance tube testers may be divided into two general classifications, first the type wherein direct current potentials are applied to all electrodes with the exception of the heater, and second those tube testers in which alternating current potential is applied to the anode as well as the heater and which are in general of the portable type. Tube testers in this second classification may have either direct or alternating current grid bias potentials. The potentials mentioned herein are those applied to the various electrodes previous to the application of a signal or a shift in voltage in the grid circuit to obtain a corresponding change in anode current.

Tube testers in the first classification must of necessity be large and rather bulky to provide space for heavy duty components required in the well regulated direct current supplies for the anode, screen grid, and other electrode potentials. Since the plate resistance of vacuum tubes of the receiving type may vary anywhere from two or three hundred ohms to one hundred thousand ohms, the regulation of the anode and screen supplies is most important. Tube testers of this type therefore are generally limited to permanent or semi-permanent installations and are not practical for portable service.

This invention relates to devices in the second classification. In general there are two methods employed in the manufacture of portable mutual conductance tube checkers. The first of these is the so-called grid shift type in which alternating current potentials are applied to all electrodes, a direct current instrument is connected in the anode circuit, and subsequent differentials of anode current are noted on the direct current instrument when suitable changes in grid potential are made. Various plate voltages and grid potentials can be applied to the electrodes to obtain a measurement on the desired portion of the grid voltage-plate current characteristic curve of the tube. In tube testers of this type to obtain the differential of plate current resulting from grid voltage change, it is necessary for the operator to subtract the initial plate current reading from the second or higher milliammeter reading. This differential plate current is, of course, porportional to the mutual conductance of the tube under test.

An improvement in the alternating current shift type of tube tester comprises a circuit wherein a single reading of the differential plate current is indicated on the direct current instrument. In other words, a reverse current of varying magnitude controlled by a rheostat is caused to flow in the milliammeter circuit whereby the pointer of the milliammeter may be returned to the zero position to cancel out the initial plate current reading. Subsequent shift in grid potential will then give a single indication of proportional mutual conductance, as noted by the magnitude of the meter indication when the grid shift button is depressed.

Another type of alternating current grid shift tube tester comprises a pair of balanced transformer windings. These windings supply anode potentials in series with a dual anode rectifier tube to suppress the alternate half-cycle potentials. A direct current milliameter is connected across a two section balancing potentiometer to provide the completion of a modulation bridge. Theoretically, if the transformer windings are carefully balanced and the potentiometer sections are in exact alignment, the milliammeter will show no initial indication of plate current and will deflect with indications proportional to mutual conductance when an alternating potential of the same frequency as that used to energize the balanced plate windings is applied to the grid electrode of the tube under test. Rectified alternating current potentials must be applied to the screen and grid electrodes previous to the application of the alternating grid potential. There are several disadvantages in this system in that unless pairs of balanced transformer windings are provided in the device, one plate potential must be used for testing all receiving tube types. In addition, the two windings supplying the plate current energy must be balanced carefully, that is, within the order of one percent to eliminate an initial plate current indication. Without careful balancing of these windings, on application of alternating potential to the grid circuit of the tube under test the meter indication will be in error by the amount of initial unbalance reading. A further disadvantage is involved in the use of a two section potentiometer which must track accurately on both sections throughout its full range of rotation. This potentiometer is required for changes in meter sensitivity to cover tests on various types of tubes.

An object of the present invention is to provide tube checkers that, without manual adjustments, afford a direct indication or measurement of the mutual conductance of the tube under test. An object is to provide an alternating current type of mutual conductance tester in which a meter in the plate circuit of the tube is not affected by current of the energizing source frequency and measures only the plate current component developed by a single voltage of a different, and preferably a higher, frequency on the tube grid. More specifically, an object is to provide apparatus for the measurement of the mutual conductance of a tube, the apparatus including a transformer with a plurality of secondary windings for developing energizing potentials for the tube electrodes, an oscillator also energized from the transformer for supplying a higher frequency signal voltage to the control grid of the tube under test, and a meter connected to the plate circuit of the tube through a frequency selective network that excludes low frequency currents from the meter.

These and other objects and the advantages of the invention will be apparent from the following specification when taken with the accompanying drawings in which.

Figure 1:
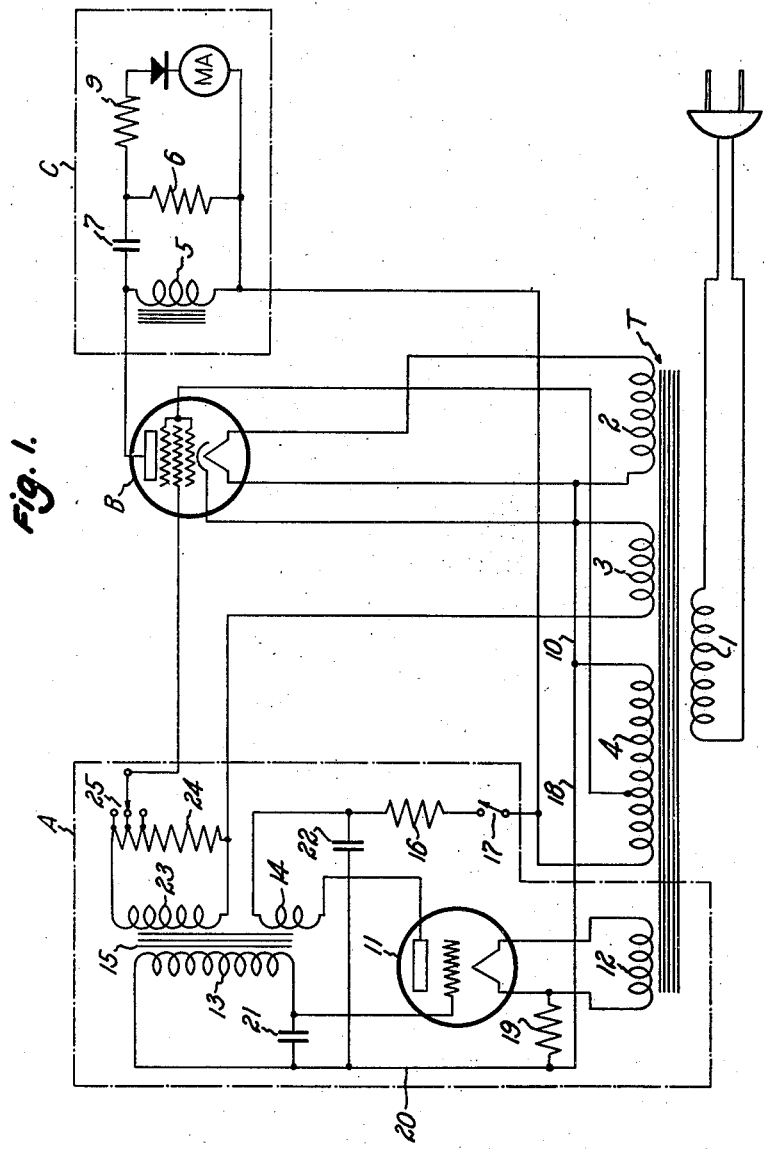
Figure 1 is a simplified circuit diagram of a mutual conductance measuring apparatus embodying the invention.

The essential elements of the novel apparatus for the direct measurement of mutual conductance include a power transformer T for developing all energizing potentials, a signal source such as that shown within the broken line rectangle A for generating a higher frequency signal voltage, a socket for receiving the vacuum tube B that is to be tested, and a measuring circuit comprising the circuit elements within the broken line rectangle C for indicating the anode current component due to the applied signal pulse derived from the oscillator A. Commercial embodiments of the invention will usually include a plurality of sockets for receiving different types of tubes but, for simplicity of illustration and description, the Figure 1 diagram does not show the socket for the illustrated tetrode B nor the sockets, and their circuit connections to transformer T, for receiving other types of tubes.

The power transformer T has a primary winding 1 for connection to the conventional light and power circuit, and secondary windings 2, 3, 4 for developing the required heater or filament current, the grid bias voltage, the screen grid stage and the plate voltage respectively for energizing the tube B. A series inductor 5 is included in the plate circuit lead to the tube B, and the measuring circuit includes a resistance 6 that is shunted across the plate circuit inductor 5 through a condenser 7 having a low impedance at the signal voltage frequency. The voltage drop across the plate circuit inductor 5 develops a current through resistor 6 that is measured in a circuit including a resistor 9 and an instrument 8 that may be of any suitable type such as the rectifier meter as shown.

A lead 10 connects the secondary windings 2, 3, 4 to ground the cathode on the heater circuit and to complete the plate-cathode circuit of tube B, the sense of the windings 3, 4 and their connections to the tube elements being such that the grid bias is negative when the plate potential is positive.

The grid signal generator A may be of any desired type and, as illustrated, includes a triode 11 with a filamentary cathode that is connected across the secondary winding 12 of the transformer T, and grid and plate inductances 13, 14 respectively coupled by a magnetic core 15. The plate voltage is taken from the secondary winding 4 through a resistor 16 and switch 17, the plate-cathode circuit being completed by a lead 18 and cathode resistor 19. The grid of the oscillator tube is returned to the cathode resistor by a lead 20; and condensers 21, 22 respectively are connected across the grid and plate inductances. A winding 23 on the core 15 is connected across the resistor 24 to constitute the oscillator output circuit, and the resistor 24 is connected between the grid of tube B and grid-biasing winding 3 of the transformer T. A tap switch 25 is preferably associated with the oscillator output resistance 24 to permit adjustment of the magnitude of the signal voltage applied to the grid of the tube B.

Figure 2:
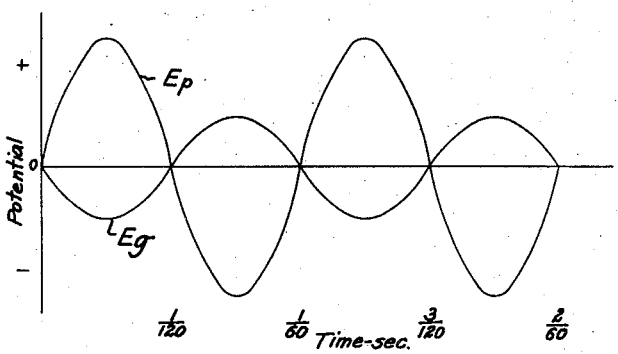
Figure 2 is a composite curve showing on a time basis the voltages imposed upon the grid and the plate of the tube under test by an alternating current energizing source.
Figure 3:
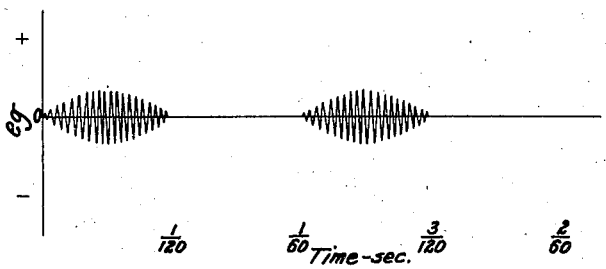
Figure 3 is a curve showing on a time basis the interrupted pulses of signal voltage.
Figure 4:
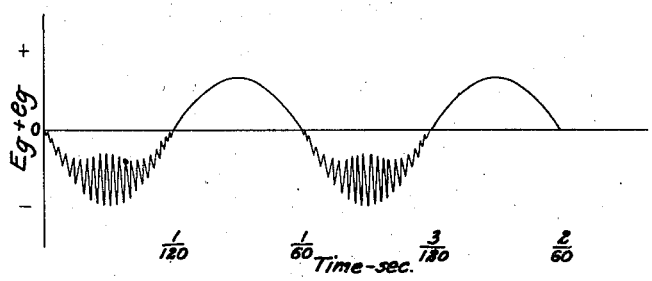
Figure 4 is a curve showing the instantaneous summation of the bias and signal voltages applied to the grid.

The method of operation will be apparent from a consideration of the several voltage and current relationships that are indicated in Figs. 2 to 5 inclusive. The signal voltage generator A is operative only during those half cycles of the low frequency energizing current during which the plates of the signal voltage generator tube 11 and of the representative tube B are at a positive potential with respect to their cathodes, and periodic pulses of high frequency (compared to the energizing frequency) signal energy of the character shown in Fig. 3 are, therefore, developed when the switch 17 is closed. The frequency of the signal voltage is high as compared with the frequency of the energizing potentials supplied through transformer T, but may be and possibly is of the relatively low order of 5 kilocycles, for a power line frequency of 50 to 60 cycles per second. The essential requirement is that the signal frequency differ from the power line energizing frequency by an amount that affords substantial isolation of power line and signal frequency by the frequency-selective branches of the plate circuit of tube B. An alternating current bias is applied to the grid of tube B by transformer winding 3, and the voltage on the grid therefore varies cyclically as shown by the curve of Fig. 4. The signal pulses are generated during those alternating half-cycles when the grid bias on tube B is negative with respect to the cathode and the plate potential is positive. When switch 17 is in the open position, causing the signal voltage generator to be inoperative, the grid-plate voltage relationships of Fig. 2 are apparent.

Figure 5:
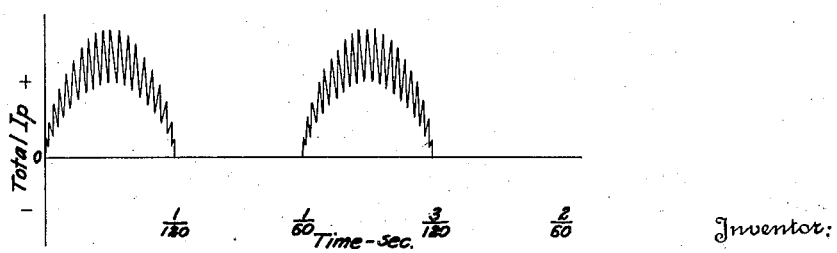
Figure 5 is a curve showing on a time basis the total plate current including the component resulting from the application of the signal and bias potentials.

The plate circuit inductor 5 has a relatively low impedance at the frequency of the energizing source which is assumed, as indicated in Figs. 2 to 5, to be 60 cycles per second, but the coupling condenser 7 to the measuring circuit C has a high impedance at that frequency. The values of the inductor 5 and condenser 7 are so chosen, in accordance with conventional design practice, that the 60 cycle pulses of plate current are completely excluded from the meter. The signal generator is energized by closing the switch 17, and pulses of the higher frequency signal voltage are impressed upon the grid of tube B during the half-cycles of negative grid bias. The wave form of the resultant plate circuit current is shown in Fig. 5. This high frequency signal plate current is excluded from the plate inductor and flows through the condenser 7 and the measuring circuit. Thus, the magnitude of the signal current is indicated by the measuring instrument 8. The instrument scale may be calibrated directly in values of mutual conductance, as explained hereinafter, when the source voltage is substantially constant or when means, not shown, is provided for adjusting the voltage across the transformer winding 1 to a constant preselected value.

The voltage regulating means that may be required, if and when the power line voltage is not constant, forms no part of the present invention and therefore no voltage regulating means has been illustrated. It is to be noted, however, that the single adjustment of the input voltage across the primary transformer winding 1 to a preselected value will condition the apparatus for the accurate measurement of mutual conductance.

If the amplitude of the signal potential is designated as $e_g$, then when this potential is zero, the current in the plate circuit is the normal rectified pulsating current which passes through the low value inductance 5 without any appreciable voltage drop due to the current through this inductance. This current does not flow through resistor 6 because of the relatively low voltage drop across the inductance, and the high impedance of condenser 7 at the energizing or power line frequency. When, however, the signal potential $e_g$ has some value other than zero, the amplifying property of the tube results in an alternating current component $i_p$, at the signal frequency, in the total plate current. This component $i_p$ divides between the inductance 5 and the measuring circuit 6—9 in accordance with the relative impedances of these parallel paths. Since there is a wide difference in frequency, there is likewise a very substantial difference in impedances of these two paths and the high frequency signal current through inductance 5 is negligible. The current through resistor 6, and likewise the current through the instrument 8 is therefore proportional to the entire alternating current component which results from the signal voltage applied to the grid.

The well-known relation between this current $i_p$ and the grid signal voltage $e_g$ is:

$$i_p = e_g \times g_m$$

where $g_m$ is the mutual conductance or $$g_m = \frac{i_p}{e_g}$$

If, therefore, the signal voltage $e_g$ is maintained constant by means previously mentioned, the instrument may be calibrated directly in terms of mutual conductance. For example, if switch 25 is indexed to the correct position for a value of 1 volt, and the summation of the current through resistor 6 and instrument 8 in series with resistor 9, is adjusted for 3 milliamperes, then a full scale deflection on the instrument 8 would correspond to 3,000 micromhos; that is $$g_m = \frac{0.003}{1} \times 1,000,000 = 3,000$$

Similarly, for a signal voltage of 0.25 volt the full scale deflection of the instrument will be 12,000 micromhos. Thus, it is possible to make a multirange device having any desired complement of measuring ranges by either changing the magnitude of the signal voltage or changing the instrument current.

It is to be understood that the invention is not limited to the particular embodiment herein illustrated and described, as various changes that may occur to those familiar with the design and construction of apparatus for measuring tube characteristics fall within the scope of the invention as set forth in the claims. For instance, direct current potentials may be applied to the grid, screen and suppressor electrodes of the tube under test, with alternating current applied to the anode through a frequency selective network as shown in section C of Fig. 1. In this case, since direct current potentials would be available for application to the electrodes of the tube under test, the same direct current source might likewise be used for energization of signal voltage generator. Certain advantages would be obtainable with this arrangement, since only moderate currents are involved on these particular electrodes, i. e. screen grid, control grid and suppressor grid, and fair regulation of the direct current source would not be difficult to attain. Higher orders of current involved in the anode circuit of the tube under test would, however, present a more difficult problem and, therefore, the alternating current supply for the anode circuit is preferred.

I claim:

1. In apparatus for measuring the mutual conductance of a tube having a grid electrode and one or more other electrodes cooperating with a cathode, one of said electrodes being a plate; means for impressing alternating current voltages upon said electrodes to energize the tube, means for imposing an alternating current signal voltage of a different frequency upon said grid, and indicating means responsive only to the plate current component resulting from said applied signal voltage, said indicating means providing a direct indication of the mutual conductance of the tube.

2. Apparatus for measuring the mutual conductance of a tube having a grid electrode and one or more other electrodes cooperating with a cathode, one of said electrodes being a plate; said apparatus comprising means for impressing energizing voltages on said electrodes, said means imposing a periodically fluctuating potential of relatively low frequency on said plate, means for imposing an alternating current signal voltage of a different frequency upon said grid, and indicating means responsive only to the plate current component resulting from said applied signal voltage, said indicating means providing a direct indication of the mutual conductance of the tube.

3. Apparatus for measuring the mutual conductance of a tube having a grid electrode and one or more other electrodes cooperating with a cathode, one of said electrodes being a plate; said apparatus comprising means for impressing energizing voltages on said electrodes, said means imposing a periodically fluctuating potential of relatively low frequency on said plate, means for imposing an alternating current signal voltage of a different frequency upon said grid, an anode circuit network having parallel reactive componenets, one component selectively transmitting alternating currents of the plate energizing frequency and the other component selectively transmitting alternating currents of the signal frequency, and indicating means responsive to current in the parallel circuit that transmits currents of the signal frequency.

4. In apparatus for measuring the mutual conductance of a tube having a grid and a plate cooperating with a cathode, means for impressing alternating current voltages upon said grid and plate to energize the tube, means for imposing an alternating current signal voltage of a different frequency upon said grid, a plate circuit impedance, and a measuring circuit coupled across at least a part of said plate circuit impedance by a reactance having a high impedance at the frequency of the energizing potentials and a low impedance at the signal frequency.

5. In apparatus for measuring the mutual conductance of a tube having a grid and a plate cooperating with a cathode, energizing means for said tube including a transformer having a primary winding for connection to a power line and a plurality of secondary windings for supplying alternating current to heat said cathode and for impressing alternating current voltages on said grid and plate, means for impressing an alternating current signal voltage of higher frequency on said grid, a plate circuit inductor of high impedance at the signal frequency, and a measuring circuit connected across said plate circuit inductor, said measuring circuit having a high impedance at the power line frequency and a relatively low impedance at the signal frequency.

6. In apparatus for measuring the mutual conductance of a tube, the invention as recited in claim 5 wherein said means for impressing a signal voltage on the grid comprises a vacuum tube oscillator energized from said transformer.

7. In apparatus for measuring the mutual conductance of a tube, the invention as recited in claim 5 wherein said means for impressing a signal voltage on the tube grid comprises a vacuum tube oscillator having grid and plate circuits, and a connection from the plate circuit of the oscillator to the secondary winding that develops the alternating potential for application to the plate of the tube under measurement, whereby said oscillator generates pulses of the signal frequency during those half-cycles of the power line frequency when the plate of the tube under measurement is at a positive potential.

8. In apparatus for measuring the mutual conductance of a tube, the invention as recited in claim 5 wherein said measuring circuit includes a rectifier type direct current instrument.

9. The method of testing thermionic tubes which comprises energizing the elements of the tube at rated voltage and relative polarity with A. C. voltage of a predetermined relatively low frequency, superimposing upon the control element of the tube a predetermined alternating current voltage of relatively high frequency to effect a change in the plate current of the tube under test, and measuring the change in plate current which is due to the superimposed high frequency voltage to indicate a characteristic of the tube.

10. The method of testing thermionic tubes which comprises energizing the elements of the tube at rated voltage and relative polarity with A. C. voltage of a predetermined relatively low frequency, superimposing upon the control element of the tube a predetermined alternating current voltage of relatively high frequency to effect a change in the plate current of the tube under test, and measuring the average change in plate current which is due to the superimposed high frequency A. C. voltage on the control element.

11. A thermionic tube tester comprising means for energizing the elements of the tube under test at their rated voltages with A. C. voltage of relatively low frequency, the control element being energized at a polarity opposite to the plate element, means for superimposing an alternating current voltage of a relatively high frequency on the grid of the tube under test, and means for measuring the average change in plate current, which is due to the superimposed high frequency voltage, to indicate a characteristic of the tube.

12. A thermionic tube tester comprising a transformer having a plurality of secondaries, predetermined of said secondaries being connected to energize the elements of a tube under test at their rated voltages, the grid being connected for polarity opposite to the plate, an oscillator energized from another secondary of said transformer and connected to superimpose a high frequency alternating current on the grid of the tube under test, an output circuit adapted to separate the plate current due to normal energization at rated voltages and the plate current change due to the high frequency superimposed on the grid, and means for measuring the change in plate current due to the high frequency superimposed on the grid.

13. In a tester for thermionic tubes, the combination of a transformer with means for adjusting the applied voltage to the transformer primary, said transformer having a plurality of secondaries, one of said secondaries being utilized for energizing the filament of the tube under test and another for energizing the plate and grid, the grid being connected in reverse polarity to that of the plate, an output circuit for the plate of the tube under test having a pair of branches with selective impedance in each branch for differentiating between A. C. components of different frequency, means for superimposing on the grid a voltage of different frequency from that used for energizing the elements of the tube, means for rectifying one of the selected components of the plate current, and means for measuring the rectified component of the plate current.

OLIVER JAMES MORELOCK.

REFERENCES CITED

The following references are of record in the file of this patent:

UNITED STATES PATENTS

| Number | Name | Date |
|---|---|---|
| 2,179,048 | Miller | Nov. 7, 1929 |
| 2,367,868 | Jones | Jan. 23, 1945 |